July 24, 1956

A. C. MAMO 2,755,628

HYDRAULIC TORQUE CONVERTER

Filed May 22, 1951

Inventor:
Anthony C. Mamo

By: H. J. Schmid
Atty.

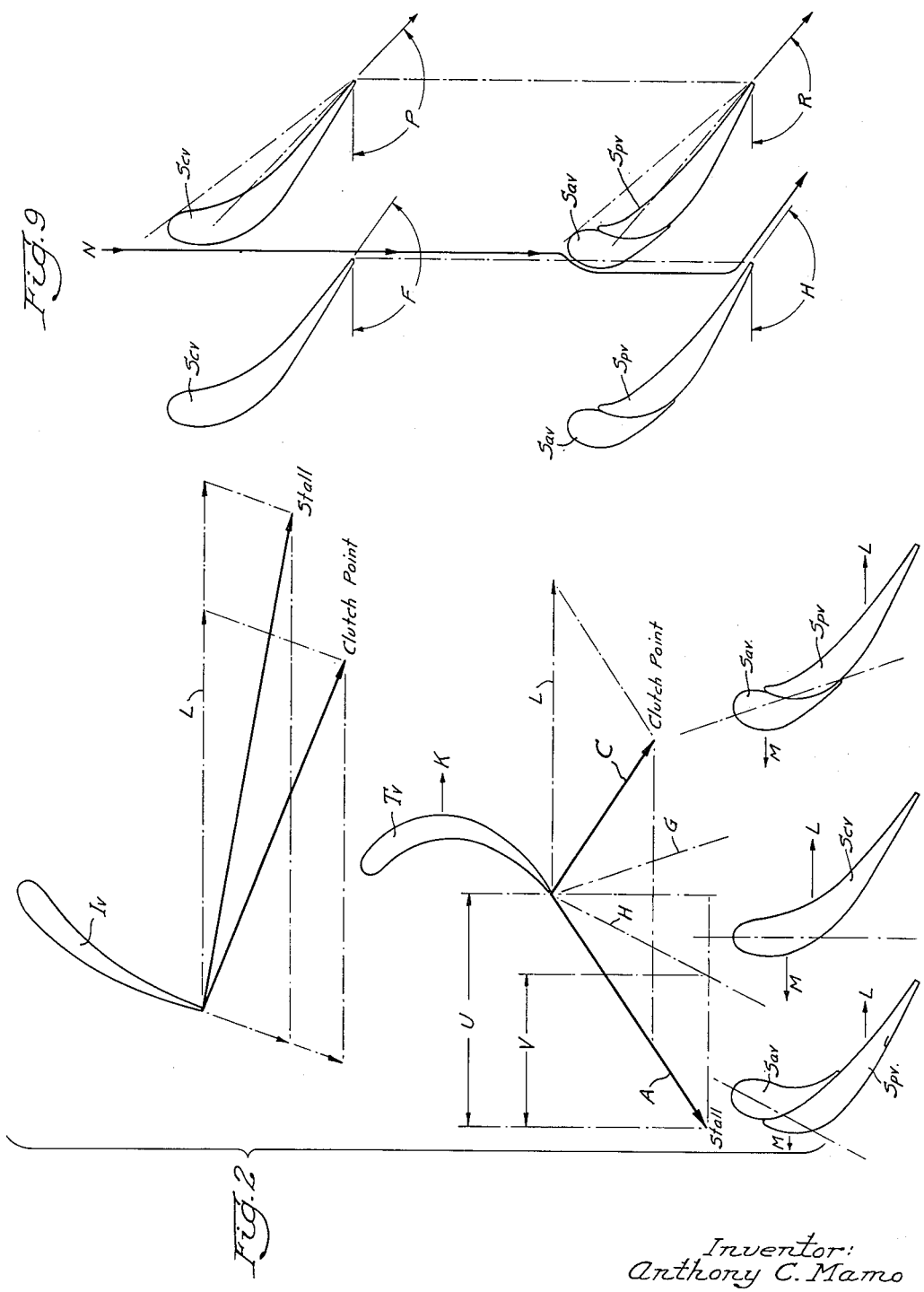

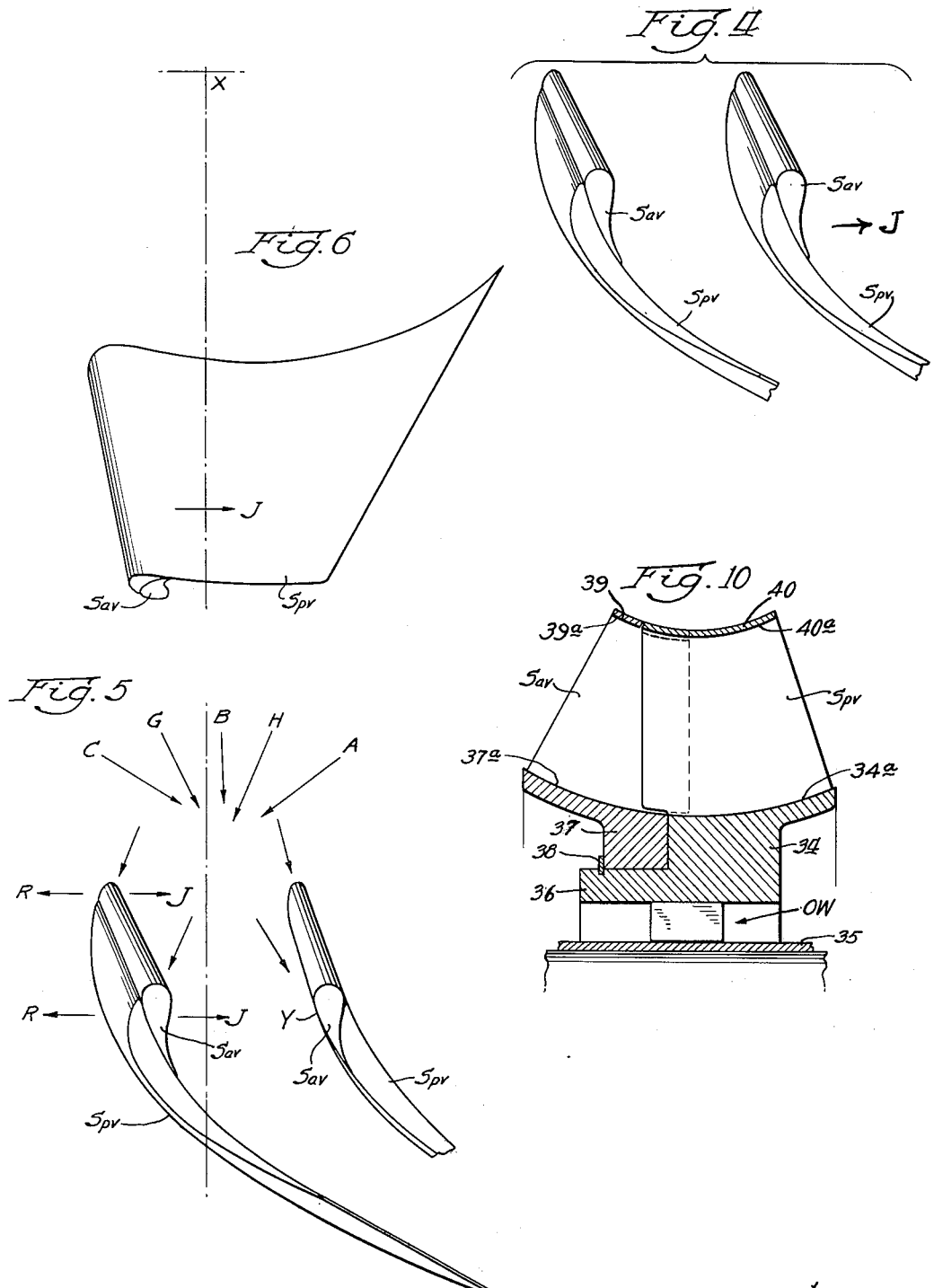

United States Patent Office 2,755,628
Patented July 24, 1956

2,755,628

HYDRAULIC TORQUE CONVERTER

Anthony C. Mamo, Detroit, Mich., assignor to Borg-Warner Corporation, Chicago, Ill., a corporation of Illinois Application May 22, 1951, Serial No. 227,683

10 Claims. (Cl. 60—54)

This invention relates to hydraulic torque converters and more particularly to such torque converters of a type having vaned elements defining a closed fluid circuit and including a driving pump or pumps, a driven turbine or turbines, and a stator or stators, the vanes of the elements having curvatures designed to control the fluid to provide infinitely varying torque multiplication ratios during relative rotation of the pump or pumps and turbine or turbines when the stator or stators are influential in providing the reaction necessary for torque multiplication.

It is an object of the present invention to provide a hydraulic torque converter element having vaned structure providing variable inlet angles under the influence of changing fluid flow conditions.

Another object of the invention is to provide a hydraulic torque converter element having vaned structure with portions thereof automatically adjustable by angular changes in fluid flow into the element to vary the inlet angle of the vaned structure to conform to the different angles of fluid flow during torque multiplication.

Another object of the invention is to provide a hydraulic torque converter element having vaned structure comprising primary vanes and auxiliary vanes relatively rotatable about a common axis to position the auxiliary vanes in engagement with the inlet portions of the primary vanes to vary the inlet angle of the vaned structure.

Another object of the invention is to provide a hydraulic torque converter element having vaned structure comprising primary vanes, and auxiliary vanes engageable therewith to provide substantially continuous curved surfaces having inlet portions thereof inclined at substantially the same angle as the direction of fluid flow into the element during the initial stage of the torque multiplication range of the converter, the auxiliary vanes being rotatable relative to the primary vanes by variations in the angles of fluid flow into the element for engaging other of the inlet portions of the primary vanes, during the final stage of the torque multiplication range of the converter, to present other and different substantially continuous curved surfaces having inlet portions inclined at substantially the same angle as the direction of fluid flow into the element.

A further object of the invention is to provide a hydraulic torque converter element having two or more sets of vanes relatively rotatable about a common axis under the influence of changes in direction of fluid flow into the element.

A further object of the invention is to provide a hydraulic torque converter element having two or more sets of vanes, the vanes of one set having different curved surfaces than the vanes of the other set, the vanes of one of the sets being rotatable as a unit relative to the second set of vanes for engagement with one or the other of the opposite sides of the vanes of the second set for providing different combinations of the surfaces of the vanes of the two sets.

Another object of the invention is to provide a hydraulic torque converter element having engaging vane-supporting members relatively rotatable about a common axis and a plurality of vanes on each member, the vanes of each member having portions thereof extending into a plane normal to the axis of rotation of the members to engage each vane on one member with the adjacent vanes on the other member during relative rotation of one member relative to the other member in opposite directions.

Another object of the invention is to provide a hydraulic torque converter element, in the form of a stator, having a plurality of vanes having inlet portions designed to conform to different angles of the fluid flow from another torque converter element, such as a turbine, during a predetermined difference in speed of the pump and turbine vaned elements, the stator having over vanes relatively rotatable to said first mentioned vanes thereof and engageable with the opposite sides of the inlet portions of the first set of vanes to provide inlet angles of the engaged vane structure conforming to the different angles of fluid flow from the turbine during other and different speeds of the pump and turbine elements.

Another object of the invention is to provide a hydraulic torque converter comprising an impeller, a turbine and a stator forming a closed fluid circuit, the stator having two sets of vanes disposed in the fluid circuit, one set of vanes being fixed to a supporting member connected to a stationary member by means of a one-way brake, the second set of vanes being fixed to an annular member rotatably mounted on the supporting member and about the axis of rotation of the torque converter, the second set of vanes having curvatures designed to effect rotation of the annular member in response to the change in the angles of fluid flow from the turbine into the stator during variations in the speeds of rotation of the impeller and turbine when the one-way brake is functioning to prevent rotation of the supporting member and said one set of vanes.

Other objects and advantages of the invention will appear more clearly from the following specification in connection with the accompanying drawings in which:

Fig. 1 is an axial section of a fragmentary portion, preferably one-half, of a hydraulic torque converter including a vaned impeller and a vaned turbine, and my improved vaned stator structure, the stator structure including primary and auxiliary vanes;

Fig. 2 is a diagrammatic showing of the impeller, turbine and stator vanes shown in Fig. 1 and vectorially illustrating the various angles of fluid flow during different stages of the torque multiplication and coupling range of the converter, the auxiliary stator vanes being shown in various positions assumed with respect to the primary stator vanes under the influence of different angles of fluid flow from the turbine, the view further illustrating a conventional stator vane for comparison with my stator structure;

Fig. 4 is a view of identical pairs of primary and auxiliary vanes of the stator vane structure, as viewed along the line 4—4 of Fig. 1;

Fig. 5 is another view of the stator vanes similar to Fig. 2 but illustrating the vanes in greater detail and the different positions of the primary and auxiliary vanes under the influence of changes in angles of fluid flow from the turbine;

Fig. 6 is a side view of the vanes shown in Fig. 5;

Fig. 9 is another diagrammatic comparison illustration of the characteristics of conventional stator vanes and the stator vanes of my stator structure;

Fig. 10 is a modification of the stator vane-supporting and mounting arrangement.

Figure 1:
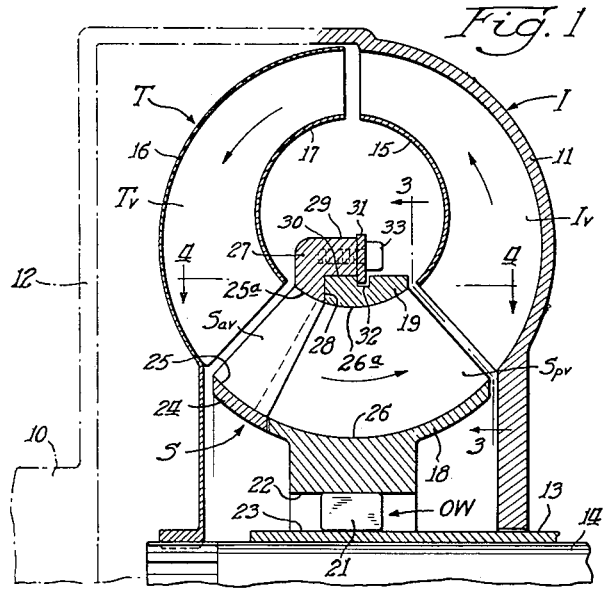
Figure 3:
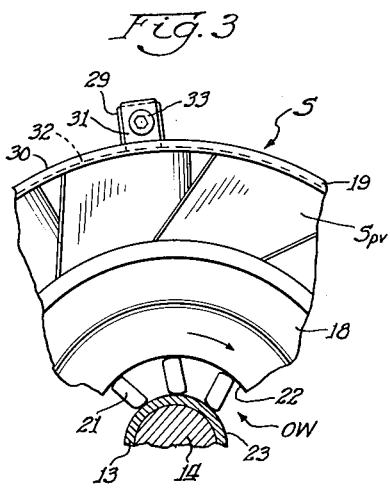
Fig. 3 is a sectional view of the stator structure shown in Fig. 2, said section being taken on lines 3—3 of Fig. 1 and looking in the direction of the arrows.

Referring to the drawings and more particularly Figs. 1 and 3 thereof for a description of the mechanical structure of a hydraulic torque converter embodying the invention, the torque converter comprises a vaned driving element, in the form of a pump or impeller identified at I; a driven vaned element, in the form of a turbine or runner indicated generally at T, and a vaned element, in the form of a reactor or stator, indicated generally at S. The impeller I is driven by a shaft 10 connected to an engine, or other power device (not shown) and is effective to impart energy to a body of liquid in the torque converter, the turbine absorbing energy from the energized liquid, and the stator acting to change the direction of flow of the liquid therethrough so the torque converter functions to multiply torque.

The impeller I comprises an outer annular semi-toroidal shell 11 drivingly connected to the shaft 10 by means of a hollow drum-like casing 12, the shell 11 surrounding and being rotatably mounted on a stationary sleeve 13 receiving a driven shaft 14. The casing 12 and impeller shell 11 define an enclosure containing fluid within which the turbine and stator are disposed. The impeller also comprises a core member or ring 15, defining with the shell 11, a semi-toroidal fluid space within which a plurality of vanes $I_v$ are positioned, the vanes extending between and being connected to the shell 11 and core member 15.

The turbine T comprises an outer shell 16 and a core member or ring 17 defining a semi-toroidal fluid space within which vanes $T_v$ are positioned and connect the outer shell 16 and core member 17.

The stator S comprises primary vane structure including a radially inwardly disposed annular supporting member or hub 18 and a core member or ring 19 connected by primary vanes $S_{pv}$, the hub 18 of the supporting member being connected by means of a one-way brake OW to the stationary sleeve 13. The one-way brake OW disclosed has a plurality of sprag members 21 disposed between an outer cylindrical surface 22 or race on the hub 18 and an inner cylindrical surface or race 23 on the stationary sleeve 13, the one-way brake functioning to prevent rotation of the stator hub 18 and hence vanes $S_{pv}$ in one direction of rotation as indicated by the arrow in Fig. 3 and permits rotation of the same in the opposite direction. The stator S further comprises an auxiliary vane structure comprising inner and outer rings 24 and 27 connected by vanes $S_{av}$ extending therebetween and fixed thereto. The radially inner ring 24 is closely adjacent to the stator hub and formed with its outer curved surface 25 struck from the same common center as the curved surface 26 on the stator hub 18. As will be clearly apparent from inspection of Figs. 1 and 3, the similarly directionally curved radially inner surfaces 25 and 26 of the ring 24 and the hub 18, respectively, are formed to have curvatures toric in shape; also the similarly directionally curved surfaces 25a of the ring 27 and 26a of the core ring 19 have toric curvatures. It will be noted that the primary vanes $S_{pv}$ have their radially inner and outer edges extending across surfaces 26 and 26a from end to end thereof and beyond one end between the auxiliary vanes $S_{av}$ and these edges must be provided with toric curvatures to conform to the curvatures of the surfaces 26 and 26a of the hub 18 and core ring 19. Also, the auxiliary vanes $S_{av}$ have radially inner and outer edges extending across the surfaces 25 and 25a of the inner and outer rings 24 and 27 from end to end thereof, and these edges must be provided with toric curvatures to conform with the curvatures of the surfaces 25 and 25a. This feature is important as the fluid is always confined and completely directionally controlled in each of the several passages formed by the vanes and the radially inner and outer members of the primary and secondary vane structures. Spaced radially outwardly of the ring 25 is the ring 27 engaging at 28 one side of the core member 19. The ring 27 has a plurality of laterally extending stud portions 29 slidably fitted at 30 on the core member 19 for mounting the auxiliary vane structure for rotation relative to the primary vane structure and thereby the rotation of the vanes $S_{av}$ relative to the vanes $S_{pv}$. Movement of the auxiliary vane structure axially of the primary vane structure is prevented by keys 31 extending within an annular groove 32 in the ring 19 of the primary vane structure and fixed to the laterally extending portions 29 of the ring 27 by screws 33 extending through the keys 31 and threaded into the ring 27.

It will be apparent from the description of the stator structure that the primary vanes $S_{pv}$ are held from rotation in one direction by the one-way brake OW, the brake releasing to allow the vanes to rotate in the opposite direction, and that the auxiliary stator vanes $S_{av}$ can freely move in either direction of rotation about the axis of the converter and relative to the primary vanes to a distance equal to the distance between the vanes $S_{pv}$.

It is contemplated that the primary vane structure and the auxiliary vane structure may be formed individually as castings by casting methods well known to those skilled in the art.

Fig. 4 illustrates the position of the primary and auxiliary stator vanes as seen along line 4—4 of Fig. 1 and showing the auxiliary vanes $S_{av}$ in engagement with the primary vanes $S_{pv}$ at one of the two limits of movement of the auxiliary vanes relative to the primary vanes when the primary vanes are held from rotation by the one-way brake OW. Further, each auxiliary vane is positioned between two primary vanes and, when the auxiliary vanes rotate as a unit, these vanes will move less than the distance between two adjacent primary vanes (see Fig. 5), so that each auxiliary vane can engage with one or the other of the two adjacent sides of the primary stator vanes which define the limits of rotation of the auxiliary vane relative to the primary vanes. An important feature of the present invention is that each of the vanes $S_{pv}$ and $S_{av}$ is streamlined and of airfoil shape, with the airfoil shapes of each vane $S_{pv}$ and $S_{av}$ designed to complement each other to form a single composite vane of airfoil shape when the auxiliary vane $S_{av}$ engages one or the other of the adjacent sides of the primary vanes between which each auxiliary vane is positioned as clearly shown in Figs. 2, 5 and 7. For example, referring to the engaged vanes at the left in Figs. 2 and 5, the exposed sides of the auxiliary vane $S_{av}$ and the primary vane $S_{pv}$ form a composite vane of airfoil shape having substantially continuous smooth streamlined surfaces on opposite sides thereof; and, also, the engaged vanes at the right in Fig. 5 illustrate that the exposed sides of the composite vane, thus formed, have substantially continually smooth streamlined surfaces on opposite sides thereof. Accordingly, the airfoil shapes of the composite vanes insure that the fluid will flow freely and in the desired guided direction along the streamlined surfaces of the composite vanes without hydraulic losses which would occur were the direction of the fluid streamlines along the surfaces suddenly changed or abruptly interrupted.

It will be noted that the primary vanes and auxiliary vanes are curved to present convex and concave surfaces on opposite sides thereof, the concave side of each primary vane engaging the convex side of an auxiliary vane to increase the overall concaveness of the composite vane, the convex side of each main vane engaging the concave side of an auxiliary vane to reduce the overall convexity of the composite vane.

Figure 7:
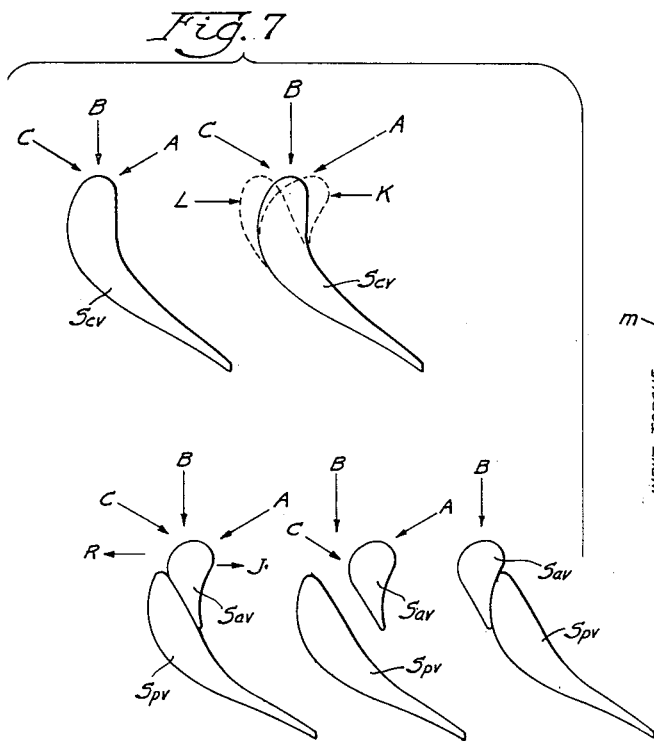
Fig. 7 is a diagrammatic comparison illustration showing fixed conventional stator vanes in the upper half of the view, and primary and auxiliary vanes of my stator structure in the lower half of said view, and also the relative fluid flow angles at stall and during different portions of the torque converting range, from the turbine towards the stator vanes.

It is to be understood that, in Figures 2, 5 and 7, the illustration of the primary stator vane $S_{pv}$ engaged with the auxiliary stator vane $S_{av}$ at the left of the views show the similar positions of all of the stator auxiliary vanes with respect to the primary stator vanes when the auxiliary vanes are at one limit of rotation thereof; and that the primary stator vane and the auxiliary stator vane shown to the right of these views are representative of the positions of all of the auxiliary vanes relative to the primary vanes at the other limit of rotation thereof. The auxiliary stator vanes rotate in opposite directions to engage the primary stator vanes, during multiplication stages of the torque converter, to favorably receive the fluid flow from the turbine and guide the fluid through the stator to reduce energy losses of the fluid flow in a manner that will now be more particularly pointed out.

A torque converter, embodying my invention, has certain advantageous features which can best be explained by reference to the operation of a hydraulic torque converter having conventional impeller, turbine and stator vane designs and a converter having the same impeller and turbine vanes and my improved stator vane structure. In hydraulic converters, the fluid circulates in a closed fluid circuit as indicated by the arrows in Fig. 1, the impeller and turbine vanes rotate in the direction L in Fig. 2. During relative rotational speeds of the impeller and turbine, the fluid flows from the impeller at different angles between, and including, the angles indicated at "stall" and "clutch point"; also the fluid flows from the turbine toward the stator at different angles between, and including, the angles indicated A and C at "stall" and "clutch point." In the case of conventional stators where the stator comprises only a single set of fixed vanes $S_{cv}$ as shown in Figs. 2 and 7, it is possible to obtain efficient torque conversion only when the difference in speed between the impeller and the turbine is some predetermined amount. In explanation, the turbine vanes must be designed with curvatures to absorb the energy of the fluid energized by the impeller, the turbine vanes directing the flow of the fluid, leaving the turbine, in a wide range of different angles toward the stator, as shown in Fig. 2. Where fixed stator vanes are employed, the inlet angles of the stator vanes are usually designed to be efficient only at moderate turbine speed for the following reasons.

Referring to Figure 7, A, B and C represent the different angles of fluid flow from the turbine toward conventional fixed stator vanes $S_{cv}$, A representing the direction of flow from the turbine during low turbine speed, B indicating the direction of flow during moderate turbine speed, and C representing the direction of flow during high turbine speed. The efficiency of a torque converter increases as the hydraulic losses are minimized and among these hydraulic losses are shock losses occurring, for example, when the angle of fluid flow from the turbine differs substantially from that of the inlet angle of the stator vanes. In the event the angle of fluid flow from the turbine differs substantially from that of the inlet angle of the stator vanes, considerable disturbance in the circulation of the fluid in the torque converter may occur due to the different angles of impingement of the fluid upon the vanes of the stator. Such hydraulic losses, and particularly shock losses, decrease the efficiency of the torque converter as the shock losses reduce the velocity of the fluid circulating in the torque converter with consequent decrease in the maximum transmission of power available. In conventional types of hydraulic torque converters employing a single set of fixed stator vanes, the inlet angle of the stator vanes $S_{cv}$, as shown in Fig. 7, is generally designed to favor angles of flow from the turbine at moderate turbine speeds in the range such as indicated at B in Figure 7. Increasing the inlet angle of the stator, as shown in dotted lines at K, favors flow conditions at low turbine speeds, while decreasing the inlet angle, as shown in dotted lines at L, will favor flow at high turbine speeds.

Figure 8:
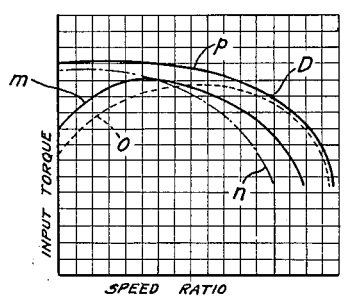
Fig. 8 is a graph illustrating a comparison of the torque converting and efficiency characteristics of hydraulic torque converters embodying the conventional stator vanes of Fig. 7 and a torque converter embodying my novel stator structure.

Referring to Figure 8, this graph illustrates the input torque of an engine plotted against the speed ratio of the driving impeller and driven turbine, and also curves $m$, $n$ and $o$ illustrating characteristics of torque converters having stators with conventional fixed vanes designed to respectively provide different inlet angles as previously described with respect to Fig. 7; and the curve $p$, the characteristics of a torque converter having my stator vane structure. In Fig. 8 the input torque curve $n$ illustrates the favoring of flow conditions from the turbine at low turbine speeds when the inlet angle of the fixed conventional stator vanes are such as indicated at K in Figure 7, the curve $o$ illustrating the favoring of flow conditions from the turbine at high turbine speeds when the inlet angle of the stator is such as indicated at L in Figure 7; and the curve $m$ illustrates the favoring of flow from the turbine at moderate turbine speeds when the stator vanes are as represented by the solid lines in Fig. 7.

Referring more particularly to Figure 8, it will be apparent from the angles A, B and C of fluid flow from the turbine that the flow in the direction A is substantially at the same as the inlet angle of the stator vanes when the vanes are as indicated at K which is indicated in the graph by the curve $n$ which illustrates that low shock losses occur, and consequent high efficiency of the torque converter is obtained at low turbine speeds, but that, during moderate and high turbine speeds (when the fluid flows from the directions B and C), the fluid flow encounters the stator vanes at an awkward angle resulting in substantial shock losses occurring which cause the efficiency of the torque converter to decrease rapidly.

Referring to the curve $o$ it will be seen that the fluid flow in directions A and C is at different angles than the inlet angle of the stator vanes (shown in solid lines) so that considerable shock losses and low efficiency occur at both high and low turbine speeds but that, at moderate turbine speeds, in and about the direction B approximates the inlet angles of the vanes whereby the shock losses decrease to raise the efficiency of the converter over a considerably wider range of turbine speeds than the stator vanes producing the curves $m$ and $n$.

Referring to Figures 5 and 7, Fig. 7 illustrates diagrammatically the vanes $S_{pv}$ and $S_{av}$ and Fig. 5 shows the vanes in greater detail, the primary and auxiliary stator vanes at the left of each figure indicating the position of each of the auxiliary stator vanes $S_{av}$ in relation to the primary stator vanes $S_{pv}$ at the stall condition of the torque converter when the impeller is rotating and the turbine is stationary, and the primary and auxiliary vanes on the right illustrate the position of each of the auxiliary stator vanes with respect to primary stator vanes during the final stages of torque conversion when the impeller and turbine are rotating substantially at the same speed but prior to freewheeling of the stator structure by release of the one-way brake. In Fig. 7, the centrally located vanes $S_{pv}$ and $S_{av}$ are shown in spaced relation to each other in the positions they assume when the turbine speed is moderate.

The different angles of fluid flow, represented at A, B and C, from the turbine are the same as those shown with respect to the conventional stator vanes $S_{cv}$ in Fig. 7, the angle of fluid flow from the turbine at low turbine speed being indicated at A, moderate turbine speed indicated at B, and high turbine speed at C. It will be seen that the inlet angle of the stator auxiliary vane $S_{av}$ at low turbine speed (when the auxiliary vanes are engaged with the right side of the leading edge of the primary stator vanes as shown at the left in Figure 7) is substantially at the same angle A of the fluid flow from the turbine with consequent negligible shock losses occurring at low turbine speed.

Assuming each auxiliary vane is engaged with the right side of the leading edge of a primary vane as shown at the left in Figs. 2, 5 and 7, and referring particularly to Figs. 5 and 7, the fluid from the turbine flows from the turbine in the direction indicated at A and engages the auxiliary vanes at an angle forcing these vanes in the direction R and into engagement with the primary vanes. As the angle of fluid flow from the turbine changes from the direction A to the direction H and then B at increasing turbine speeds, the auxiliary vanes will be maintained in engagement with the primary vanes by the action of the fluid, the inlet angle of the auxiliary vanes substantially conforming to the different directions of fluid flow from the turbine. As the turbine speed further increases when the directions of fluid flow from the turbine changes just beyond B in the direction G, the fluid will begin to urge the auxiliary vanes in the direction J to rotate these vanes as a unit away from the primary vanes so that the fluid will impinge upon the right side of the leading edge of each primary vane which, as shown in Fig 7, is curved to conform to substantially the directions B to G of fluid flow from the turbine.

When the direction of the fluid flow changes from G to C, the fluid urges the auxiliary stator vanes in the direction J until the right sides of the vanes are flush with the left sides of the leading edges of the primary vanes as shown at the right in Figs. 2, 5 and 7. It will be apparent that the directions of fluid flow between G and C are at substantially the same angles as that of the surface Y on the left side of the auxiliary vanes.

It will be apparent that the primary and auxiliary vanes of my stator function to provide variable inlet angles conforming to the different angles of fluid flow from the turbine which effectively minimizes shock losses with consequent increased efficiency throughout the torque conversion range of a torque converter embodying my invention. Referring to the comparison graph, the curve *p* illustrates the input torque of such converter and it may be noted that the torque is high during the torque conversion stages and drops upon reaching the coupling or clutch point D. A corresponding increase in efficiency and raising of the coupling point will result.

Referring to Fig. 5, the angle of fluid flow in the direction A from the turbine is the stall condition of the converter and the speed ratio will be zero at this time. As the direction of fluid flow from the turbine changes from A to H at low turbine speed, the speed ratio will change from zero to .30. As the angle of fluid flow from the turbine changes from H to B, the speed ratio will increase from .30 at H to .60 at B when the turbine is rotating at a moderate speed. As the angle of fluid flow changes from B to G, the speed ratio increases from .60 to .75, the speed ratio gradually increasing thereafter until .90 speed ratio is obtained when the direction of fluid flow from the turbine is such as indicated at C which corresponds to high turbine speed and also high car speed. This is the clutch point when the turbine is rotating substantially at the same speed as the impeller. The point X (above Figure 6) illustrates the center of rotation about which the auxiliary stator vanes will rotate when urged to do so. It will be apparent that the auxiliary stator vanes rotate less than one blade space up to the clutch point at approximately .90 speed ratio and that, at this time, the auxiliary and primary vanes will rotate together in the direction J and the one-way clutch OW will release to free the stator for rotation with the impeller and turbine, these vaned elements then rotating as a unit.

Referring to Figure 2 diagrammatically illustrating the impeller, turbine, and primary and auxiliary stator vanes, and the direction of fluid flow therefrom during different stages of torque conversion and at the clutch point of the converter, the stator vanes will remain stationary at stall, or for as long as the fluid from the turbine reacts against them. An examination of the vector diagram illustrated will show the proportion of the shock losses for a conventional fixed stator vane $S_{cv}$ and my stator vane structure. The shock losses of the conventional stator at stall, for example, are proportional to the square of length U. The shock losses of my improved stator under the same condition is proportional to the square of the shorter line indicated at V. It will be understood that the longer the line the greater will be the shock losses. Comparative gains during any range of operation may be found in a similar manner. If the shock losses of the fluid entering the stator are reduced, then it follows that the energy content of the fluid leaving the stator is greater. This remaining energy is redirected into the impeller and is added to engine torque. These gains are cumulative (within limits) and continue to build up with each complete circuit of the fluid.

Referring to Figure 9, a pair of fixed conventional stator vanes $S_{cv}$ are shown at the top of this figure and these stator vanes have a given true outlet angle F at a given spacing. These conventional stators in this figure are compared to two pairs of my primary and auxiliary vanes with the same true outlet angle H and spaced the same distance apart. The fluid flow, indicated at N, is intended to show that at some range of operation, the conventional stator vanes give only small guidance to the fluid flow. Following the fluid flow N down to my primary and auxiliary stator vanes, it will be seen that more fluid guidance in the desired direction is obtained.

Obviously, it is possible to get equal guidance from the conventional stator vanes by adding more vanes; however, this not only restricts the fluid flow but introduces more vanes against which shock losses must be counted. As has been previously mentioned the true outlet angles, indicated at F and H, are the same; however, an examination of the geometry showing the hydraulic outlet angle (see the right-hand vane of each pair) will show that the outlet angle R is greater than the outlet angle P. The respective stators will not free-wheel until the outlet angle of the fluid leaving the turbine at the clutch point is as great as, or greater than, the hydraulic outlet angle of the stator. It will be apparent that my improved stator vane structure will still be giving torque multiplication, while the conventional stator will be free-wheeling. While polyphase stators are well-known in the art and which comprise a pair of stators each having a free-wheeling unit and vanes designed to successively effect rotation of the stator vanes in response to changes in angular direction of fluid flow from the turbine, such combination of stator vanes tends to be less efficient than the stator disclosed embodying my invention as, in polyphase stators, one set of stator vanes is spaced from the other set of vanes so that no torque multiplication may be obtained in the space between the two sets of stator vanes.

Figure 10 illustrates another embodiment of my stator structure and more particularly a different structural arrangement for effecting rotation of the auxiliary vanes relative to the primary vanes as previously described.

This stator structure comprises a hub 34 supporting the primary stator vanes $S_{pv}$. A one-way clutch OW is disposed between the hub and the stationary sleeve 35. The hub 34 is provided with a laterally extending portion 37 upon which is rotatably mounted a ring 36 supporting the auxiliary stator vanes $S_{av}$. The ring 36 is retained against axial movement relative to the hub 34 by means of a split lock washer 38 engaging the side of the ring to maintain it in engagement with one side of the hub 34. It will be noted that the similarly directionally curved, radially inner surfaces 37a and 34a of the ring 37 and the hub 34, respectively, are provided with curvatures toric in shape; and the similarly directionally curved surfaces 39a of the core ring 39 and 40a of the core ring 40 have toric curvatures. The primary vanes S$_{pv}$ have their radially inner and outer edges extending across the surfaces 34a and 40a of the inner and outer rings 34 and 40 from end to end thereof and these edges are provided with toric curvatures to conform to the curvatures of the respective surfaces 34a and 40a of the hub 34 and ring 40. Also the radially inner edges of these vanes extend beyond one end of the surface 34a of the hub 34 while the radially outer edges terminate at the one end of the core ring 40. The auxiliary vanes S$_{av}$ have radially inner and outer edges extending across the surfaces 37a and 39a of the inner and outer rings 37 and 39 from end to end thereof with the radially outer edges of the vanes extending beyond the ring 39 and the radially inner edges of the vanes extending beyond the ring 37. The edges of these auxiliary vanes S$_{av}$ are toric in shape to conform to the toric curvatures of the respective surfaces 37a and 39a of the rings 37 and 39.

While the various views of the drawings illustrate the auxiliary vanes S$_{av}$ have curvatures corresponding exactly to the curvatures of the adjacent engageable sides of the leading edges of the vanes S$_{pv}$, the vanes S$_{pv}$ and S$_{av}$ do not necessarily have to contact each other for the entire length of the common contour line as shown. It may become advantageous to purposely provide a gap of approximately one-sixteenth of an inch (1/16") between the primary vanes and each auxiliary vane in the respective conditions when each auxiliary vane is engaged with the side of an adjacent primary vane, as shown, for example, at the left in Fig. 5, or when each auxiliary vane is engaged with the side of the other adjacent primary vane, as shown, for example, at the right in Fig. 5, to overcome inaccuracies in individually casting the primary vane structure and the auxiliary vane structure, such gaps being permissible as they will not impair the efficiency of the stator.

While the invention has been described with particular reference to certain preferred embodiments of vaned stator structure, it will be understood that the invention is equally applicable to any vaned element of a hydraulic torque converter including an impeller and a turbine. The invention is, therefore, not to be considered as limited in any way to the stator structures herein disclosed by way of example but is to be considered as embracing such structures as may fall within the scope of the appended claims.

What is claimed is:

1. A hydrodynamic coupling element comprising spaced annular members; primary vanes of airfoil shape extending between and rigidly connected to said members; spaced annular elements; auxiliary vanes of airfoil shape extending between and rigidly connected to said elements, said annular members and primary vanes being linearly disposed in end to end relationship with the annular elements and auxiliary vanes and the adjacent ends of the primary and auxiliary vanes extending between one another, and one of said annular elements being mounted for rotation on one of said spaced annular members to engage each of said auxiliary vanes with one or the other of the two adjacent primary vanes, the engaged primary and auxiliary vanes forming composite vanes of airfoil shape with each composite vane having substantially continuous streamlined surfaces on opposite sides thereof for smoothly guiding fluid along said surfaces.

2. A hydrodynamic coupling element comprising spaced annular members; primary vanes of airfoil shape extending between and rigidly connected to said members; spaced annular elements; auxiliary vanes of airfoil shape extending between and rigidly connected to said elements, said annular members and primary vanes being linearly disposed in end to end relationship with the annular elements and auxiliary vanes and the adjacent ends of the primary and auxiliary vanes extending between one another, with the said ends of the primary vanes defining inlet portions of said primary vanes and one of said annular elements being mounted for rotation on one of said annular members to engage each of said auxiliary vanes with one or the other of the inlet portions of the two adjacent primary vanes, the engaged primary and auxiliary vanes forming composite vanes of airfoil shape with each composite vane having substantially continuous streamlined curved surfaces on opposite sides thereof for smoothly guiding fluid along said surfaces.

3. In a hydraulic torque converter comprising impeller, turbine and stator elements rotatable about a common axis and defining a closed fluid circuit, each of said elements having curved vanes guiding the fluid flow and also directing the fluid flow at different angles to another element during changes of speed of the impeller and turbine elements, the improvement residing in said stator element having primary vanes with inlet portions each provided with a surface inclined at substantially the angles of fluid flow from the turbine element at moderate turbine element speeds, and auxiliary vanes positioned between said inlet portions of said primary vanes and rotatable about the axis of rotation of said elements in response to changing angles of fluid flow from the turbine element at different turbine element speeds and having surfaces of its curved sides corresponding to the curvature of the surfaces of the sides of the inlet portions of the primary vanes between which it is positioned to engage one or the other of the said sides of said inlet portions of said primary vanes, each of said auxiliary vanes having one of said surfaces at one side thereof inclined at substantially the same angle as the angles of fluid flow from the turbine element at high turbine element speeds when each auxiliary vane has the other of its said surfaces engaged with the surfaces of one side of one of the adjacent primary vanes and having its said other surface at the opposite side thereof inclined at substantially the angles of fluid flow from the turbine element at low turbine element speeds when each auxiliary vane has its said one surface engaged with the surface of the opposite side of the other adjacent primary vane.

4. In a hydraulic torque converter comprising impeller, turbine and stator elements rotatable about a common axis and defining a closed fluid circuit, each of said elements having curved vanes guiding the fluid flow and also directing the fluid flow at different angles to another element during changes of speed of the impeller and turbine elements, the improvement residing in one of said elements having primary vanes with inlet portions each provided with a surface inclined at substantially the angles of fluid flow from a second element in a certain range of relative speeds of the impeller and turbine elements, and auxiliary vanes positioned between said inlet portions of said primary vanes and rotatable about the axis of rotation of said elements in response to changing angles of fluid flow from said second element at different speeds of said second element and having surfaces of its curved sides corresponding to the curvatures of the surfaces of the sides of the inlet portions of the primary vanes between which it is positioned to engage one or the other of the said sides of said inlet portions of said primary vanes, each of said auxiliary vanes having one of said surfaces at one side thereof inclined at substantially the angles of fluid flow from said second element in a second range of relative speeds of the impeller and turbine elements when each auxiliary vane has the other of its said surfaces engaged with the surface of one side of one of the adjacent primary vanes and having its said other surface at the opposite side thereof inclined at substantially the angles of fluid flow from the second element in a third range of relative speeds of the impeller and turbine elements when each auxiliary vane has its said one surface engaged with one side of the other of the adjacent primary vanes.

5. A hydraulic coupling comprising vaned driving and driven wheels and a vaned reaction wheel rotatable about an axis and defining a torus to provide a fluid path, the improvement residing in one of said wheels comprising primary vanes of airfoil shape; spaced annular members having facing similarly directionally curved surfaces defining a portion of said torus, said primary vanes extending between said members and having opposite edges conforming to the curvature of said surfaces thereof and extending from one end to the other end of said members and rigidly connected to said members to provide enclosed fluid passages confining and completely directionally controlling the fluid in said passages; auxiliary vanes of airfoil shape; spaced annular elements having facing similarly directionally curved surfaces defining another portion of said torus, said auxiliary vanes extending between said elements, having opposite edges conforming to the curvatures of said surfaces thereof, and extending from one end to the other end of said elements, and rigidly connected to said elements to provide enclosed fluid passages confining and completely directionally controlling the fluid in the latter passages, the annular members and primary vanes being linearly disposed in end to end relationship with the annular elements and auxiliary vanes and the adjacent ends of the primary and auxiliary vanes extending between one another for engagement with each other upon rotation of the auxiliary vanes a distance equal to the distance between the primary vanes, one of said annular elements being supported on one of said annular members for rotation about said axis to engage each auxiliary vane with one or the other of the two adjacent primary vanes between which it is positioned.

6. A hydrodynamic coupling element comprising spaced annular members; primary vanes of airfoil shape extending between and rigidly connected to said members, each primary vane having curved fluid flow-guiding and directing surfaces on opposite sides thereof; spaced annular elements; auxiliary vanes of airfoil shape extending between and rigidly connected to said elements, each auxiliary vane having curved fluid flow-guiding and directing surfaces with fluid inlet and outlet portions, said annular members being linearly disposed with respect to said annular elements with the outlet portions of said auxiliary vanes extending between the adjacent end portions of said primary vanes, and one of said annular elements being mounted for rotation on one of said spaced annular members; whereby, during different angles of fluid flow, said auxiliary vanes are rotated to position the outlet portion of one or the other of said curved surfaces of each of said auxiliary vanes in engagement with respective adjacent curved surfaces of one or the other of the two primary vanes to form, in either of their engaged positions thereof with said adjacent surfaces, composite vanes of airfoil shape, each of the formed composite vanes having substantially continuous streamlined curved surfaces on opposite sides thereof for directing fluid along said surfaces of said composite vanes.

7. A hydrodynamic coupling element comprising spaced annular members; primary vanes of airfoil shape extending between and rigidly connected to said members, each primary vane having curved fluid-flow guiding and directing surfaces with fluid inlet and outlet portions thereof; spaced annular elements; auxiliary vanes of airfoil shape extending between and rigidly connected to said elements, each auxiliary vane having curved fluid-flow guiding and directing surfaces with fluid inlet and outlet portions thereof, said annular members being linearly disposed with respect to said annular elements with the outlet portions of said auxiliary vanes extending between the adjacent end portions of said primary vanes and one of said annular elements being mounted for rotation on one of said annular members; whereby, during different angles of fluid flow, said auxiliary vanes are rotated to position the outlet portion of one or the other of said curved surfaces of each of said auxiliary vanes in engagement with one or the other of the inlet portions of one or the other of the curved surfaces of the two adjacent primary vanes, to form in either of their engaged positions with said inlet portions of said curved surfaces of said adjacent primary vanes, composite vanes of airfoil shape, each of the formed composite vanes having substantially continuous streamlined curved surfaces on opposite sides thereof for directing fluid along said surfaces of said composite vanes.

8. In a hydrodynamic torque transmitting device, a plurality of vaned elements linearly disposed along a common axis and defining in part a closed fluid circuit, one of said elements having curved vanes guiding the fluid flow and also directing the fluid flow at different angles to a second element during changes of speed of said one element, the improvement residing in said second element having primary vanes with inlet portions each provided with a surface inclined at substantially the angles of fluid flow from said one element in a certain range of speeds of the said one element, and auxiliary vanes having outlet portions positioned between said inlet portions of said primary vanes and rotatable about the axis of said elements in response to changing angles of fluid flow from said one element at different speeds of said one element, said auxiliary vanes having the curvatures of the surfaces of the sides of its outlet portions corresponding to the curvatures of the surfaces of the sides of the inlet portions of the primary vanes between which it is positioned, to engage one or the other of said sides of said inlet portions of said primary vanes, each of said auxiliary vanes having one of said surfaces at one side thereof inclined at substantially the angles of fluid flow from said one element in a second range of speeds of the said one element when each auxiliary vane has the other of its said surfaces engaged with the surface of one side of one of the adjacent primary vanes and having its said other surface at the opposite side thereof inclined at substantially the angles of fluid flow from said one element in a third range of speeds of said one element when each auxiliary vane has its said one surface engaged with one side of the other of the adjacent primary vanes.

9. A hydrodynamic coupling element comprising a set of main vanes of airfoil shape disposed about an axis and having fluid inlet portions, a set of auxiliary vanes of airfoil shape, means mounting said set of auxiliary vanes for rotation about an axis linearly disposed with respect to the axis of said set of main vanes and as a unit relative to said set of main vanes, said auxiliary vanes having fluid outlet portions with the outlet portions of each auxiliary vane extending between the inlet portions of two adjacent main vanes, the curvatures of the surfaces of the sides of each outlet portion of each auxiliary vane corresponding to the curvatures of the surfaces of the sides of the inlet portions of the primary vanes between which it is positioned, and adapted, upon relative rotation between the two sets of vanes, to engage either one or the other of the said curved surfaces of the inlet portions of the adjacent main vanes, said set of auxiliary vanes being rotatable in either direction relative to the main vanes; whereby, during changes in the angles of incoming fluid, said set of auxiliary vanes are rotated to engage one or the other of the curved surfaces of the outlet portion of an auxiliary vane with one or the other of the curved surfaces of the inlet portions of two adjacent main vanes, and the airfoil shapes of the main and auxiliary vanes being correlated to provide composite vanes of airfoil shape in each of the positions of engagement.

10. A hydrodynamic torque transmitting element having primary vanes disposed about an axis and having inlet portions each provided with curved fluid-guiding and directing surfaces at opposite sides thereof, and auxiliary vanes positioned between said inlet portions of said primary vanes and rotatable about an axis of rotation linearly disposed with respect to the axis of said set of primary vanes and having at least one of its curved surfaces of its sides corresponding to the curvature of one of the surfaces of the sides of the inlet portions of the primary vanes between which it is positioned, one or the other of said surfaces of each auxiliary vane engaging one or the other of the said surfaces of said inlet portions of said primary vanes, during rotation of said auxiliary vanes solely in response to changing angles of fluid flow on said auxiliary vanes.

References Cited in the file of this patent

UNITED STATES PATENTS

| | | |
|---|---|---|
| 2,173,604 | Dodge | Sept. 19, 1939 |
| 2,205,794 | Jandasek | June 25, 1940 |
| 2,293,767 | Salerni | Aug. 25, 1942 |
| 2,351,516 | Jandasek | June 13, 1944 |
| 2,440,825 | Jandasek | May 4, 1948 |
| 2,651,918 | Kelley et al. | Sept. 15, 1953 |